United States Patent [19]

Nemeskeri

[11] 4,418,034

[45] Nov. 29, 1983

[54] METHOD FOR PRODUCING A CONTAINER

[75] Inventor: Georg Nemeskeri, Chester, Canada

[73] Assignee: G.N. Plastics Company Limited, Nova Scotia, Canada

[21] Appl. No.: 312,071

[22] Filed: Oct. 16, 1981

[30] Foreign Application Priority Data

Oct. 24, 1980 [CA] Canada .................................. 363175

[51] Int. Cl.³ ........................ B29C 17/04; B29C 17/07
[52] U.S. Cl. ..................................... 264/522; 264/26; 264/533; 264/544; 264/545
[58] Field of Search ................. 264/533, 544, 545, 26, 264/522, 521

[56] References Cited

U.S. PATENT DOCUMENTS

| | | | |
|---|---|---|---|
| 2,918,698 | 12/1959 | Hagen et al. | 264/545 X |
| 3,251,915 | 5/1966 | Pechthold | 264/94 |
| 3,283,047 | 11/1966 | Savary | 264/98 |
| 3,358,062 | 12/1967 | Lemelson | 264/96 |
| 3,369,690 | 2/1968 | Hayes | 215/100 |
| 4,176,153 | 11/1979 | Weiler | 264/524 |

FOREIGN PATENT DOCUMENTS

| | | | |
|---|---|---|---|
| 1133114 | 7/1962 | Fed. Rep. of Germany | 264/544 |
| 1238800 | 7/1960 | France | 264/544 |

*Primary Examiner*—Jan H. Silbaugh
*Attorney, Agent, or Firm*—Cushman, Darby & Cushman

[57] ABSTRACT

A re-sealable hollow body container is disclosed together with the method of making it. The container is made with a preformed neck from a flat piece of plastic sheet or film.

1 Claim, 6 Drawing Figures

METHOD FOR PRODUCING A CONTAINER

This invention relates to containers and the method of making them and in particular to the formation of thermoplastic container shells.

Conventionally, thermoplastic containers are manufactured by a blow molding process using a thermoplastic tube or soft pipe which is blow molded from the interior of the tube or soft pipe into the container molds.

The present invention provides a substantial improvement over the conventional method of making such containers in that the container is manufactured from a single flat sheet of thermoplastic material, the sheet being softened, molded into shape and butt welded to form a container. The advantages of using a single sheet of material are many, one of which is the ability to pre-print the sheet before the molding step, a procedure which cannot be obtained in conventional practice.

According to a broad aspect, the invention relates to a hollow bodied container formed from a single sheet of plastic film, the container having a single weld extending peripherally of the container in a vertical plane.

According to another aspect, the invention relates to a method of making a resealable container with a performed neck from a single flat sheet of plastic material comprising the steps of providing an aperture in a flat sheet of plastic; inserting a heated pin in the aperture to form a neck section; inserting a non-conductive blow pin in the neck and evenly heating the sheet; raising the pin to allow the sheet to fold and inserting the sheet in an open mold; closing the mold and applying blow pressure through a blow pin to expand the container into the mold cavities; applying a short pulse to create a butt weld, opening the mold, removing the blow pin and removing the finished container from the mold.

The invention is illustrated by way of example in the accompanying drawings in which:

FIG. 3 is another elevation view showing the formation of the neck;

Figure 6:
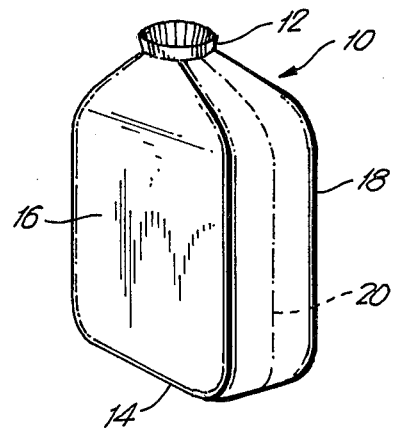
FIG. 6 is a perspective view of a container formed by the process of the invention.

Referring to the drawings, and in particular FIG. 6, a resealable, hollow bodied container 10 has a preformed neck 12, bottom wall 14 and front and rear sidewalls 16 and 18 respectively joined by a flangeless, electronic weld 20 extending vertically of the container. The container can be of generally flat configuration as illustrated or the walls can be of any other desired shape.

Figure 1:
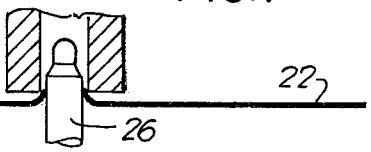
FIG. 1 is an elevation view of a sheet of plastic.
Figure 2:
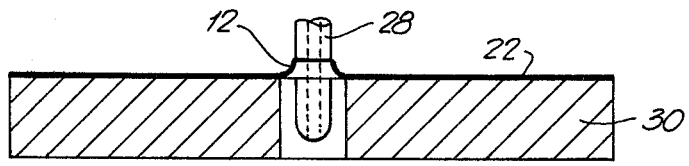
FIG. 2 is an elevation view of one step of the process.
Figure 4:
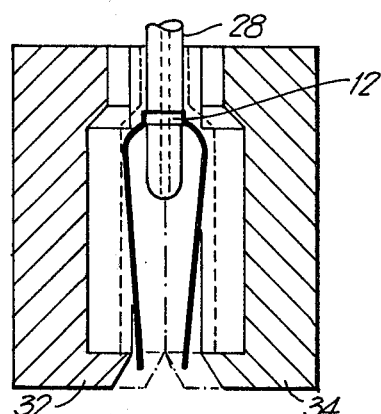
FIG. 4 is a cross-sectional view of the mold shown in one position.
Figure 5:
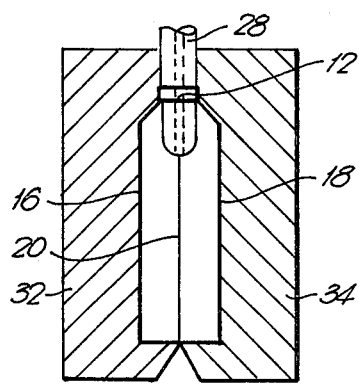
FIG. 5 is a cross-sectional view of the mold shown in another position.

Referring to FIGS. 1 through 5, FIG. 1 shows a flat sheet 22 of thermoplastic film in which a suitable aperture 24 has been made. The formation of the neck section 12 of the container is effected by inserting a heated pin 26 through the aperture 24 of the sheet and subsequently inserting a plastic, non-conductive, blow pin 28 in the neck and heating the sheet 22 evenly either on a hot plate 30 as illustrated in FIG. 3 or with radiant heat or by some other suitable method, ensuring that there is no excess heat at the section of the neck 12. Subsequently, the pin 28 is lifted and the sheet 22, softened by the heat, is allowed to fold as shown in FIG. 4 and the sheet, after folding is inserted between the halves 32, 34 of an opened mold. As shown in FIG. 5, the mold halves are then closed and blow pressure is applied through the pin 28 to expand the walls 16, 18 of the container into the mold cavities and the pin 28 and neck section 12 are drawn upwardly to form the finished neck section as shown in FIG. 5, the softened material taking the shape of the mold halves 32 and 34.

A short pulse of radio frequency is then applied to the molds to create the flangeless weld 20 and increased closing pressure is then applied to the molds to create a cutting effect. The molds are subsequently opened, the blow pin is removed and the finished container is removed from the molds.

While the invention has been described in connection with a specific embodiment thereof and in a specific use, various modifications thereof will occur to those skilled in the art without departing from the spirit and scope of the invention as set forth in the appended claims.

The terms and expressions which have been employed in this specification are used as terms of description and not of limitation, and there is no intention in the use of such terms and expressions to exclude any equivalents of the features shown and described or portions thereof, but it is recognized that various modifications are possible within the scope of the invention claimed.

I claim:

1. The method of making a re-sealable container with a preformed neck from a flat piece of plastic sheet comprising the steps of:
   (a) providing an aperture in a flat sheet of plastic;
   (b) inserting a heated pin in said aperture to re-shape the sheet of plastic surrounding the aperture to form a neck opening and subsequently removing the heated pin;
   (c) inserting a non-conductive blow pin in said neck opening and evenly heating said plastic sheet;
   (d) raising said non-conductive blow pin to make said preformed neck and to allow the plastic sheet to fold, and inserting said plastic sheet between open mold halves;
   (e) closing said mold halves and applying blow pressure through said blow pin to blow up said plastic sheet within the confines of said mold;
   (f) applying a welding pulse to said mold halves to create a weld along the free edges of the plastic sheet material to form said container; and
   (g) opening said mold halves, removing said blow pin from the preformed neck, and removing the finished container.

* * * * *